Patented Apr. 20, 1937

2,077,449

UNITED STATES PATENT OFFICE 2,077,449

PROCESS OF CHILLPROOFING AND STABILIZING MALT BEVERAGES

Leo Wallerstein, New York, N. Y.

No Drawing. Application June 1, 1936, Serial No. 82,925

15 Claims. (Cl. 99—48)

The present invention relates to improvements in beers, ales, and other fermented malt beverages.

In Patent No. 955,825 to Leo Wallerstein, dated June 20, 1911, there is disclosed a method of chillproofing bottled beers, by adding papain derived from papaw or bromelin derived from the fruit of the pineapple in their normal state of activity thereto.

In chill-proofing the beers or ales according to the process of this patent, it was customary to use enzyme preparations which contained but one of the enzyme preparations mentioned, and to use the enzyme preparation in its normal condition of activity.

I have now discovered that when plant enzymes, active in slightly alkaline, neutral and slightly acid concentrations and particularly papain, malt enzmyes, or bromelin, are mixed with metabolic products obtained upon the growth of certain types of fungi, or molds, their action is substantially enhanced and a better chill-proofing and stabilization of the malt beverage is obtained with most economical utilization of the enzymes.

For example, it has been found that with such mixtures superior chill-proofing and stability will result as compared to the effect of the enzyme preparations singly, such superior results being obtained even with smaller quantities of said enzymes having less enzymatic power.

For example, the beer or ale, treated with the combinations of the present invention, will remain chill-proof for a much longer time, as for example, when it has been in a bottle for many weeks and months. And pasteurized or germ-filtered beers so treated will keep their brilliancy for long periods both at ordinary and low temperatures and even though they be subjected to repeated changes in temperature ranging from freezing up to room temperatures.

This desirable activity of the enzyme preparations is obtained when papain, bromelin, and/or malt enzymes singly or in combination are mixed with metabolic materials derived from the cultivation of *Aspergillus oryzae* and *wentii*, *Mucor delemar*, *Amylomyces rouxii*, Penicillium and other similar fungi and molds.

In carrying out the present invention, enzyme mixtures such as those above referred to are added to beer, ale or other malt beverage at any suitable stage in the production, preferably after boiling of the wort. While the addition may be made at one time or at different times, before, during or after fermentation, the addition of small proportions of the composite enzyme preparations after the main fermentation and during storage has been found satisfactory. It has also been found satisfactory to add these mixtures to the clarified beer shortly before bottling.

The preferred proportions include the addition of 1 to 10 grams of the preparation to each barrel of beer, each barrel containing 31 gallons of beverage. Of this, 1 to 10 grams from 0.5 to 5 grams may consist of papain, the malt enzyme and/or bromelin singly or in combination, while the other ½ to 5 grams may consist of the metabolic preparations derived from one or more of the above specified micro-organisms. The latter metabolic preparations should preferably not be used in the mixture in greater amounts than the former.

When Aspergillus, Mucor or Penicillium are cultivated to produce the metabolic products the following procedure is found to be satisfactory.

A culture medium, preferably consisting of comminuted or broken grains of cereals, such as wheat, corn, oats and barley, from which a greater part of the starch material has been removed, is suitably moistened with water and thoroughly sterilized. The culture medium may consist of bran shorts or middlings. Other media may be utilized, such as residues from beer brewing, alcohol fermentation processes, and so forth.

After the sterilization of the culture media, as for example with steam, the spores of the desired fungus or mold are sown therein. The moisture of the media may vary, but preferably ranges between 40% to 60% by weight.

After sowing the fungus seed spores upon the culture media, the entire mass is preferably formed into a bed, although this is not essential. This bed is maintained in a moist atmosphere at a uniform temperature varying from 35° to 45° C. and preferably not exceeding the latter limit.

The growth may be continued while agitating the mass by stirring or the mass may be permitted to lie in a quiescent condition. In the former case the thickness of the mass preferably is increased to 2 to 3 feet, while in the latter case the bed of material is kept fairly thin, as for example, from 1 to 2 inches in thickness to provide for aeration.

The fungus or mold growth is permitted to continue from 3 to 5 days and then the metabolic preparation is extracted by lixiviating the mass with water.

After this extraction, the liquor is separated from the fungi or mold growth and the culture material. For example, the growths and culture material may be removed by high speed centrifuges or by filtration. It must be done, however, under conditions to prevent infection. This is best accomplished either by operating at very low temperatures and/or preferably by the addition of suitable antiseptics, such as sulfites or alcohol, to the metabolic liquor.

Only comparatively small amounts of these concentrated metabolic materials are needed to accomplish the enhancement of the papain or other plant protease.

It is desirable to concentrate the active principles contained in the liquor and to use the concentrated preparation which is more stable and may readily be stored, packaged and transported.

In order to prepare such a concentrated product, the active principles contained in the liquor are precipitated from this liquor by the addition of alcohol or acetone. As a general rule from one to two volumes of these precipitating agents are sufficient for every volume of metabolic liquor to be precipitated.

Another method of concentrating these metabolic substances consists in salting out the active principles by the addition to the metabolic liquors of about an equal volume of a saturated ammonium sulfate solution. In either method of concentration the precipitated material is separated by centrifuging or filtration and dried at a lower temperature, preferably at about less than 40° C.

Mixtures as described above, not only give improved chill-proofing and stability with more economical utilization of plant enzymes, but in addition, most satisfactorily modify carbohydrate and protein materials in the beverage to give improved flavor, taste and quality.

Metabolic preparations derived from the growth of molds and fungi may also be combined with enzyme preparations derived by the growth of the bacteria as by the growth of *B. subtilis* or *B. mesentericus* as disclosed in application Ser. No. 759,738, filed Dec. 29, 1934, of which the application is a continuation-in-part and these combined fungi and bacterial enzymes may then be combined with papain, bromelin, malt enzymes or mixtures of these last mentioned enzymes.

In some cases, animal enzymes, such as pepsin and kathepsin may be included.

The various combinations disclosed according to the present application have a better action not only in chill-proofing the beer, but also in otherwise improving its quality than would be expected from the additive effect of the materials themselves.

It is to be understood that many variations and modifications may be practiced without departing from the scope of the present invention, the above examples having merely been given by way of illustration, and not by way of limitation.

The present application is similar in subject matter to the applications Ser. Nos. 668,986, filed May 2, 1933, now Patent No. 2,011,095; and 672,039, filed May 20, 1933, now Patent No. 2,011,096, which relate to process of treating, stabilizing, maturing and/or ripening beers and ales by the additions of metabolic products derived from certain types of bacilli and molds. Enhanced enzyme mixtures containing pepsin and papain with or without one or more of said metabolic products, other than those claimed specifically in the present application, are more fully covered in the copending applications Ser. Nos. 759,738, filed Dec. 20, 1934; 82,924, filed June 1, 1936; and 668,987, filed May 2, 1933, all of which are being issued upon even date herewith.

I claim:

1. The process of chill-proofing and stabilizing malt beverages which comprises adding thereto an enzymatic composition including papain and a mold metabolic material, said metabolic enzymatic material being produced by cultivation of molds selected from the group consisting of the genera Aspergillus, Penicillium, Mucor and Amylomyces.

2. The process of chill-proofing and stabilizing malt beverages which comprises adding thereto an enzymatic composition including bromelin and a mold metabolic material, said metabolic material being produced by cultivation of mold selected from the group consisting of the genera, Aspergillus, Penicillium, Mucor and Amylomyces.

3. The process of chill-proofing and stabilizing an alcoholically fermented malt beverage which comprises adding thereto an enzymatic composition including proteolytic malt enzymes and a mold metabolic material produced by cultivation of a mold selected from the group consisting of the genera, Aspergillus, Penicillium, Mucor and Amylomyces.

4. The process of chill-proofing and stabilizing malt beverages which comprises adding thereto an enzymatic composition including papain and a mold metabolic material, said mold being selected from the group consisting of Aspergillus, Penicillium, Mucor and Amylomyces.

5. The process of chill-proofing and stabilizing malt beverage which comprises adding thereto an enzymatic composition including proteolytic plant enzymes which are active in slightly acid, slightly alkaline or neutral media and a mold metabolic material, said mold being selected from the group consisting of Aspergillus, Penicillium, Mucor and Amylomyces.

6. A chill-proofing and stabilizing enzymatic mixture for beers or ales comprising a proteolytic plant enzyme, selected from the group consisting of papain, bromelin, and malt enzymes enhanced by a mold metabolic material, said mold being selected from the group consisting of Aspergillus, Penicillium, Mucor and Amylomyces.

7. A chill-proofing and stabilizing enzymatic mixture for beers or ales comprising papain enhanced by a mold metabolic material, said mold being selected from the group consisting of Aspergillus, Penicillium, Mucor and Amylomyces.

8. A chill-proofing and stabilizing enzymatic mixture for beers or ales comprising bromelin enhanced by a mold metabolic material, said mold being selected from the group consisting of Aspergillus, Penicillium, Mucor and Amylomyces.

9. A chill-proofing and stabilizing enzymatic mixture for beers or ales comprising proteolytic malt enzyme enhanced by a mold metabolic material, said mold being selected from the group consisting of Aspergillus, Penicillium, Mucor and Amylomyces.

10. The process of chill-proofing and stabilizing malt beverage which comprises adding thereto an enzymatic composition, including a proteolytic enzyme of plant origin, which is active in acid media, enhanced by a metabolic material derived by the cultivation of molds selected from the group consisting of Aspergillus, Penicillium, Mucor and Amylomyces.

11. The process of chill-proofing and stabilizing malt beverage which comprises adding thereto an enzymatic composition including a proteolytic enzyme of plant origin, which is active in acid media, enhanced by a metabolic material derived by the cultivation of molds selected from the group consisting of Aspergillus, Penicillium, Mucor and Amylomyces, said composition being added in the proportion of 1 to 10 grams for every 31 gallons of the beverage.

12. The process of chill-proofing and stabilizing malt beverage which comprises adding thereto during fermentation, an enzymatic composition including papain and a metabolic material produced by cultivation of molds selected from the group consisting of genera Aspergillus, Penicillium, Mucor and Amylomyces.

13. The process of chill-proofing and stabilizing malt beverage which comprises adding thereto an enzymatic composition including papain and a metabolic material produced by cultivation of *Aspergillus oryzae*.

14. The process of chill-proofing and stabilizing malt beverage which comprises adding thereto an enzymatic composition including papain and a metabolic material produced by cultivation of Aspergillus.

15. The process of chill-proofing and stabilizing malt beverages which comprises adding thereto an enzymatic composition including papain, pepsin and a mold metabolic material, said metabolic enzymatic material being produced by cultivation of fungi or molds selected from the group consisting of the genera Aspergillus, Penicillium, Mucor and Amylomyces.

LEO WALLERSTEIN.